United States Patent
Antheunis

(10) Patent No.: US 9,556,316 B2
(45) Date of Patent: Jan. 31, 2017

(54) CURABLE COMPOSITIONS AND MEMBRANES

(71) Applicant: Fujifilm Manufacturing Europe B.V., Tilburg (NL)

(72) Inventor: Harro Antheunis, Tilburg (NL)

(73) Assignee: FUJIFILM Manufacturing Europe B.V. (NL)

( * ) Notice: Subject to any disclaimer, the term of this patent is extended or adjusted under 35 U.S.C. 154(b) by 0 days.

(21) Appl. No.: 14/897,358

(22) PCT Filed: May 30, 2014

(86) PCT No.: PCT/GB2014/051665
§ 371 (c)(1),
(2) Date: Dec. 10, 2015

(87) PCT Pub. No.: WO2014/199125
PCT Pub. Date: Dec. 18, 2014

(65) Prior Publication Data
US 2016/0137797 A1    May 19, 2016

(30) Foreign Application Priority Data
Jun. 11, 2013 (GB) .................................. 1310350.2

(51) Int. Cl.
| | | |
|---|---|---|
| C08J 5/22 | (2006.01) |
| B01D 71/40 | (2006.01) |
| C09D 4/00 | (2006.01) |
| B01D 69/12 | (2006.01) |
| B01J 39/18 | (2006.01) |
| C08F 220/58 | (2006.01) |
| C02F 1/44 | (2006.01) |
| C02F 1/469 | (2006.01) |
| B01D 61/42 | (2006.01) |
| B01D 69/02 | (2006.01) |

(52) U.S. Cl.
CPC ............ *C08J 5/2243* (2013.01); *B01D 69/125* (2013.01); *B01D 71/40* (2013.01); *B01J 39/185* (2013.01); *C09D 4/00* (2013.01); *B01D 61/42* (2013.01); *B01D 69/02* (2013.01); *B01D 2323/30* (2013.01); *B01D 2323/345* (2013.01); *B01D 2325/14* (2013.01); *B01D 2325/42* (2013.01); *C02F 1/447* (2013.01); *C02F 1/4691* (2013.01); *C02F 1/4693* (2013.01); *C02F 1/4695* (2013.01); *C08F 2220/585* (2013.01); *C08J 2333/24* (2013.01); *C08J 2333/26* (2013.01)

(58) Field of Classification Search
CPC ...... C08J 5/2243; B01D 71/40; B01D 69/125; B01D 69/02; B01D 61/42; B01D 2323/30; B01D 2323/345; B01D 2325/42; B01D 2333/24; B01D 2333/26; C09D 4/00; B01J 39/185; C08F 2220/585; C02F 1/447; C02F 1/4691; C02F 1/4693; C02F 1/4695
USPC .......................................................... 521/27
See application file for complete search history.

(56) References Cited

U.S. PATENT DOCUMENTS

| | | | |
|---|---|---|---|
| 7,807,852 B2 | 10/2010 | Ricks-Laskoski et al. |
| 7,858,822 B1 | 12/2010 | Ricks-Laskoski et al. |
| 8,134,024 B2 | 3/2012 | Ricks-Laskoski et al. |
| 8,816,029 B2 | 8/2014 | Wang et al. |
| 2009/0004548 A1 | 1/2009 | Hiraoka |
| 2011/0288227 A1 | 11/2011 | Lewandowski et al. |
| 2012/0101184 A1 | 4/2012 | Wang et al. |
| 2012/0186446 A1 | 7/2012 | Bara et al. |
| 2012/0258032 A1 | 10/2012 | Phillips et al. |
| 2012/0259027 A1 | 10/2012 | Van Berchum et al. |
| 2012/0259028 A1 | 10/2012 | Plimmer et al. |
| 2014/0305863 A1 | 10/2014 | Van Engelen |
| 2015/0290594 A1* | 10/2015 | Van Berchum .... B01D 67/0006 210/500.35 |

FOREIGN PATENT DOCUMENTS

| | | | | |
|---|---|---|---|---|
| CN | 101831023 A | 9/2010 | |
| EP | 1737000 A1 | 12/2006 | |
| JP | EP 1737000 A1 * | 12/2006 | ............. H01B 1/122 |
| JP | 2010209323 A | 9/2010 | |
| NL | WO 2013014420 A1 * | 1/2013 | ......... B01D 67/0006 |
| WO | 2007018425 A1 | 2/2007 | |
| WO | 2012045152 A1 | 4/2012 | |
| WO | 2013/011272 A1 | 1/2013 | |
| WO | 2013014420 A1 | 1/2013 | |
| WO | 2013153360 A1 | 10/2013 | |

OTHER PUBLICATIONS

International Search Report issued from corresponding PCT/GB2014/051665, dated Oct. 20, 2014.
Hanbin Diao et al, Macromolecules 2010, 43, 6398-6405.
J. Lu et al, Progress in Polymer Science 34 (2009) 431-448.
Ricks-Laskoski et al, J. Am. Chem Soc. 2006, 128, 12402-12403.

* cited by examiner

*Primary Examiner* — Michael M Bernshteyn
(74) *Attorney, Agent, or Firm* — Banner & Witcoff, Ltd.

(57) ABSTRACT

A composition comprising: a) 5 to 65 wt % of curable compound comprising one ethylenically unsaturated group and at least one anionic group; b) 2.5 to 70 wt % of crosslinking agent comprising at least two acrylic groups; c) a tertiary amine; and d) 0 to 45 wt % of inert solvent; wherein the molar ratio of component c) to a) is at least 0.7. Also described are a process for making composite membranes and the resultant membranes.

27 Claims, No Drawings

CURABLE COMPOSITIONS AND MEMBRANES

RELATED APPLICATION DATA

This application is a National Stage Application under 35 U.S.C. 371 of co-pending PCT application number PCT/GB2014/051665 designating the United States and filed May 30, 2014; which claims the benefit of GB application number 1310350.2 and filed Jun. 11, 2013 each of which are hereby incorporated by reference in their entireties.

This invention relates to curable compositions, to their use in the preparation of membranes and to the use of such membranes in ion exchange processes.

Ion exchange membranes are useful in a number of applications, including electrodeionisation (EDI), continuous electrodeionisation (CEDI), electrodialysis (ED), electrodialysis reversal (EDR) and capacitive deionisation used in e.g. flow through capacitors (FTC) for the purification of water, Donnan or diffusion dialysis (DD) for e.g. fluoride removal or the recovery of acids, pervaporation for dehydration of organic solvents, fuel cells, electrolysis (EL) of water, treatment of blowdown water in cooling tower systems, or for chlor-alkali production, and reverse electrodialysis (RED) where electricity is generated from two streams differing in salt concentration separated by an ion-permeable membrane.

EDI is a water treatment process wherein ions are removed from aqueous liquids using a membrane and an electrical potential to affect ion transport. It differs from other water purification technologies, such as conventional ion exchange, in that it is does not require the use of chemicals such as acids or caustic soda. EDI can be used to produce ultra pure water.

ED and EDR are electrochemical separation processes that remove ions and other charged species from water and other fluids. ED and EDR use small quantities of electricity to transport these species through membranes composed of ion exchange material to create separate purified and concentrated streams. Ions are transferred through the membranes by means of direct current (DC) voltage and are removed from the feed water as the current drives the ions through the membranes to desalinate the process stream. ED and EDR are suitable techniques for producing drinking water. Ion exchange membranes are also used in Zero Liquid Discharge (ZLD) and Zero Discharge Desalination (ZDD).

A membrane electrode assembly (MEA) appears suitable for a variety of applications such as electrolysis, sensors and especially fuel cells.

One of the important problems in the production of ion exchange membranes is how to provide thin membranes with minimal defects. Desirably the membranes have good permselectivity and low electrical resistance. Additionally the membranes are desired to be strong, while at the same time being flexible. Flexibility is required for membranes which are to be wound into tight circumferential structures. The membranes also need to retain their physical integrity over an extended period of time. The strength and integrity of the membrane can be improved by including a porous support to form what is known as a composite membrane. It is also desirable for the membranes to be resistant to the chemicals that they can come into contact with, e.g. resistant to hydrolysis. Low swelling on contact with water can also be useful for membranes intended for use in aqueous environments.

Membrane users require the lowest prices available, which mean production processes for the membranes are ideally inexpensive and the membranes should be easily capable of mass production.

The present invention seeks to provide compositions suitable for use in the preparation of composite membranes, in addition to rapid processes for preparing the composite membranes and the membranes prepared by the processes.

According to a first aspect of the present invention there is provided a curable composition comprising:
a) 5 to 65 wt % of curable compound comprising one ethylenically unsaturated group and an anionic group;
b) 2.5 to 70 wt % of crosslinking agent comprising at least two acrylic groups;
c) a tertiary amine; and
d) 0 to 45 wt % of inert solvent;
wherein the molar ratio of component c) to a) is at least 0.7.

In this specification (including its claims), the verb "comprise" and its conjugations are used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one".

The amount (wt %) refers to the total amount of the defined component(s) present in the composition. For example, the composition may contain more than one of a defined component, in which case the defined amount (wt %) is the total amount of all of such components present in the composition.

As examples of ethylenically unsaturated groups there may be mentioned vinyl groups, methacrylic groups and acrylic groups.

Preferred acrylic ($H_2C$═CHCO—) groups are acrylate ($H_2C$═$CHCO_2$—) and acrylamide ($H_2C$═CHCONH—) groups. Preferred methacrylic ($H_2C$═C($CH_3$)CO—) groups are methacrylate ($H_2C$═C($CH_3$)$CO_2$—) and methacrylamide ($H_2C$═C($CH_3$)CONH—) groups.

Component a) has one (i.e. only one and not more than one) ethylenically unsaturated group. Component a) has at least one anionic group.

Preferred anionic groups are sulpho, carboxy and phosphato groups and they may be in the free acid form or partially or wholly in salt form. The preferred salts are lithium, ammonium, sodium and potassium salts and mixtures comprising two or more thereof. Preferably the anionic groups present in component a) are in the free acid form when component a) is mixed with the other components to make the curable composition.

Examples of curable compounds comprising one ethylenically unsaturated group and an anionic group include acrylic acid, beta carboxy ethyl acrylate, maleic acid, maleic acid anhydride, vinyl sulphonic acid, phosphonomethylated acrylamide, (2-carboxyethyl)acrylamide and especially 2-(meth)acrylamido-2-methylpropanesulfonic acid (and salts of the foregoing).

Component a) may comprise one or more than one curable compound comprising one ethylenically unsaturated group and an anionic group. Preferably the curable compound comprising one ethylenically unsaturated group and an anionic group has a molecular weight of less than 1000 Daltons, more preferably less than 500 Daltons.

The curable compound comprising one ethylenically unsaturated group and an anionic group is preferably present in an amount of at least 10 wt %, more preferably at least 15 wt % and especially at least 19 wt %, e.g. 20 wt % or 21 wt %. The curable compound comprising one ethylenically unsaturated group and an anionic group is preferably present in an amount of less than 60 wt %, more preferably less than 55 wt %. In one embodiment the composition comprises 15 to 65 wt % of the curable compound comprising one ethylenically unsaturated group and an anionic group.

The acrylic groups present in the crosslinking agent (component b)) may be identical to each other, different from each other or some may be the same and others different. For example, the acrylic groups may all be acrylate groups or they may all be acrylamide groups. Alternatively the acrylic groups may comprise at least acrylate group and one or more acrylamide groups.

In a preferred embodiment, all of the acrylic groups are acrylamide groups or all of the acrylic groups are acrylate groups.

The crosslinking agent preferably has two, three or four acrylic groups, especially two or three acrylic groups.

The composition optionally comprises more than one crosslinking agent, for example a crosslinking agent having two acrylic groups and a crosslinking agent having more than two acrylic groups. Preferred acrylic groups are acrylamide groups because they are particularly stable against hydrolysis.

Examples of suitable crosslinking agent(s) comprising acrylic groups include bisphenol A ethoxylate (ED/phenol 1.5) diacrylate, bisphenol A ethoxylate (EO/phenol 2) diacrylate, bisphenol A glycerolate (1 glycerol/phenol) diacrylate, tricyclodecane dimethanol diacrylate, neopentyl glycol diacrylate, propanediol diacrylate, 1,3-butanediol diacrylate, 1,4-butanediol diacrylate, 1,6-hexanediol diacrylate, pentaerythritol diacrylate monostearate, 3-hydroxy-2,2-dimethylpropyl 3-hydroxy-2,2-dimethylpropionate diacrylate, dioxane glycol diacrylate, 1,4-bis(acryloyl)piperazine, 1,4-bis(acryloyl)homopiperazine, N, N-methylene bis(acrylamide), N,N-ethylene bis(acrylamide), isophorone diacrylamide and 1,3,5-triacryloylhexahydro-1,3,5-triazine. The numbers "1.5" and "2" above appearing after the text "EO/phenol" refers to the average number of ethylene oxide groups per molecule.

Optionally the crosslinking agent has an anionic group. Preferably, however, the crosslinking agent is free from ionic groups, e.g. free from anionic (e.g. sulpho, carboxy or phosphato) and cationic (e.g. quaternary ammonium) groups.

In a preferred embodiment, the crosslinking agent has a solubility in water of less 0.03 mol/l, more preferably less than 0.01 mol/l, especially less than 0.001 mol/l, when measured at 25° C. The solubility of the crosslinking agent in water may be measured by a shaking flask method or by determining the octanol water partition coefficient. For poorly soluble compounds the solubility in water is preferably measured using the octanol water partition coefficient. Details of these methods are given in the experimental section below. The aforementioned lower water-solubilities are preferred because they can lead to membranes that exhibit low swelling on contact with water and which have good resistance to hydrolysis.

Particularly preferred crosslinking agents are tricyclo (5.2.1.0(2,6)) decanedimethanol diacrylate, dioxane glycol diacrylate, 1,4-bis(acryloyl)piperazine, 1,4-bis(acryloyl)homopiperazine, N,N-methylene bis(acrylamide), N,N-ethylene bis(acrylamide), isophorone diacrylamide and N,N-(1, 2-dihydroxyethylene)bisacrylamide.

The crosslinking agent preferably has a melting point below 80° C., more preferably below 60° C., especially below 40° C., when measured at atmospheric pressure. This preference arises because in liquid form the crosslinking agent may act as reactive diluent, reducing the amount of inert solvent needed to dissolve all components and to achieve a desired viscosity.

Preferably the crosslinking agent has a molecular weight of less than 1000 Daltons, more preferably less than 500 Daltons, because a crosslinking agent bearing no ionic groups and having a high molecular weight reduces the relative amount of charged groups present in the membrane.

The weight ratio of component b) to a) is preferably <2, more preferably <1.5, especially <1.2. The weight ratio of component b) to a) is preferably >0.20, more preferably >0.30, especially >0.35.

Component b) is preferably present in an amount of at least 5 wt %, more preferably at least 10 wt % and especially at least 12 wt %. Component b) is preferably present in an amount of less than 70 wt %, more preferably less than 60 wt %, especially less than 55 wt %.

For the avoidance of doubt, except where specified otherwise, wt % figures are relative to the total weight of the composition (e.g. (weight of component/weight of composition)×100%).

Component c) is able to accept a proton, e.g. from the anionic group of component a). Preferably component a) is soluble in component c), e.g. component a) has a solubility in component c) at 20° C. of at least 10 wt %.

Preferably the identity, amounts and relative ratios of components a), b) and c) are such that component b) is completely soluble in or miscible with components a) and c). For example, in a composition comprising 45 wt % of component a) and 20 wt % of component c), the identity and amount of component b) present in the composition is preferably selected such that component b) is completely soluble in or miscible with the mixture of a) and c), even when the amount of component d) is 0 wt %.

The presence of component c) in the composition enables one to use less inert solvent (i.e. component d)) than would otherwise be the case, extreme pH values are not required and there is no need to include metal salts (e.g. lithium salts) in the composition. Typically component a) is present in the composition in the form of a salt with component c).

Preferably the molar ratio of component c) to a) is at least 0.9, especially about equimolar, (i.e. a ratio of between 0.95 and 1.05).

In one embodiment the composition comprises a crosslinking agent comprising an anionic group and, optionally, the molar ratio of component c) to a) is greater than 1. If present, this crosslinking agent comprising an anionic group may be component b) or it may be additional to component b), e.g. when the crosslinking agent contains two or more crosslinking groups, one or none of which are acrylic groups.

The composition preferably comprises sufficient component c) to ensure that component b) is completely dissolved in the composition.

Preferred tertiary amines include tri($C_{1-12}$-alkyl)amines and N-alkylated heterocyclic tertiary amines.

Preferred tri($C_{1-12}$-alkyl)amines include trimethylamine, triethylamine, tripropyl amine, tributylamine, triethanolamine, trihexylamine, dimethyl isopropylamine, N—N-diethyl-tert-octylamine, trioctylamine, dodecyldimethylamine, dodecyldibutylamine, dodecylmethylbenzylamine, tetradecylethylaniline, hexadecyldioxethylamine, 1-[bis[3-(dimethylamino)propyl]amino]-2-propanol, dimethyl isopropylamine, tris[2-(2-methoxyethoxy)ethyl]-amine, dimethylhexylamine, dimethyl cylochexylamine, dimethyl benzylamine, N—N—N'—N'-tetrakis(2-hydroxypropyl)-ethylenediamine, N,N,N',N'-tetramethyl-1,6-hexanediamine, N,N,N',N'-tetramethyl-1,4-butanediamine, N,N,N',N'-tetraethyl-1,3-propanediamine, N,N,N',N'',N''-pentamethyldiethylenetriamine, 2-[2-(dimethylamino) ethoxy]ethanol, N-methoxymethyl-diethylamine and tris[2-(2-methoxyethoxy)ethyl]amine).

Preferred heterocyclic tertiary amines include 1,4,8,11-tetramethyl-1,4,8, 11-tetraazacyclotetradecane (mpt 38-42° C.); Dabco® 33-LV; N—($C_{1-12}$ alkyl) imidazoles (e.g. 1-methylimidazole, 1-ethylimidazole, 1-butylimidazole and 1-(3-aminopropyl)imidazole); N—($C_{1-12}$-alkyl) piperidines (e.g. 1-methyl piperidine, 1-ethyl piperidine and 1-(2-aminoethyl)piperidine); N—($C_{1-12}$-alkyl) pyrroles (e.g. 1-methylpyrrole, 1-ethylpyrrole and 1-butylpyrrole); N—($C_{1-12}$-alkyl) pyrrolidines (e.g. 1-methylpyrrolidine and 1-(2-hydroxyethyl)pyrrolidine), N—($C_{1-12}$-alkyl) indoles (e.g. 1-methylindole, 1-ethylindole and 1-propylindole); tri N—($C_{1-12}$-alkyl) triazines (e.g. 1,3,5-trimethylhexahydro-1,3,5-triazine); N—($C_{1-12}$-alkyl) morpholines (e.g. N-methylmorpholine, 3-aminopropyl morpholine and 4-(2-hydroxyethyl)morpholine) and N—($C_{1-12}$-alkyl) piperazines (e.g. 1-methylpiperazine, 1ethylpiperazine, 1,4-dimethylpiperazine and 1,4-bis(2-hydroxyethyl)piperazine).

The tri($C_{1-12}$-alkyl)amines and heterocyclic tertiary amines may contain further substituents in addition to the tertiary amine group(s), e.g. groups selected from amino, aminoalkyl (e.g. $C_{1-4}$-alkylene-N-di($C_{1-8}$-alkyl), hydroxy, alkoxy (e.g. $C_{1-4}$-alkoxy) and phenyl.

Preferably component c) has a melting point at atmospheric pressure of 50° C. or lower. Preferably the identity, amounts and relative ratios of component a) and component c) are such that a mixture consisting of component a) and c) in the ratio used in the composition would have a melting point at atmospheric pressure of 50° C. or lower.

Preferably the tertiary amine (component c)) has a molecular weight of less than 1000 Daltons, more preferably less than 500 Daltons.

Component c) is preferably present in an amount of at least 2 wt %, more preferably at least 4 wt %, e.g. at least 5 wt % or at least 10 wt %. Component c) is preferably present in an amount of less than 45 wt %, more preferably less than 35 wt %, e.g. less than 30 wt % or less than 25 wt %. In certain preferred embodiments component c) is preferably present in an amount of 2 to 40 wt %, more preferably 3 to 35 wt % and especially 4 to 30 wt %.

Preferably component c) is inert.

Preferably component c) comprises 1 to 3 tertiary amines.

Preferably the composition comprises an inert solvent. The inert solvent is free from tertiary amine groups. This preference arises because such a solvent can lower the viscosity and/or surface tension of the composition and make it more suitable for curing in high-speed, continuous manufacturing processes. This inert solvent is not curable and, when present, acts as a non-reactive diluent for the other components of the composition.

As is understood in the art, "inert" means the relevant component is not capable of polymerising with component a) or b), e.g. it lacks ethylenically unsaturated groups.

Component d) is free from tertiary amine groups.

Component d) can also be useful for providing a homogenous solution of all the components of the composition.

Preferably component d) has a boiling point of 100° C. or less at atmospheric pressure.

Component d) preferably comprises water, a water-miscible organic solvent, a water-immiscible organic solvent or a combination of two or more thereof. When the composition comprises a water-immiscible solvent such solvent is preferably included in a small amount such that the overall solvent mixture is miscible.

Polar solvents, especially aqueous solvents, $C_{1-4}$ alcohols and $C_{3-4}$ ketones, are preferred because these are particularly good at dissolving the other components of the composition. In one embodiment the composition is substantially free from water (e.g. <5 wt %, more preferably <2 wt % water).

Preferred organic solvents include $C_{1-4}$-alcohols (e.g. methanol, ethanol, 2-methoxyethanol, propan-1-ol and propan-2-ol), diols (e.g. ethylene glycol and propylene glycol), triols (e.g. glycerol), carbonates (e.g. ethylene carbonate, propylene carbonate, dimethyl carbonate, diethyl carbonate, di-t-butyl dicarbonate and glycerin carbonate), $C_{1-4}$-ethers (e.g. tetrahydrofuran, 1,4-dioxane, dimethylether, diethylether and methylethylether), $C_{1-4}$-acids (e.g. acetic acid and propionic acid), $C_{1-4}$-esters (e.g. ethylacetate), $C_{1-4}$-amides (e.g. dimethyl formamide and dimethylacetamide), $C_3$-$C_4$ ketones (e.g. acetone and methylethyl ketone), acetonitrile, N-methyl-2-pyrrolidinone, dimethyl sulphoxide and mixtures comprising two or more thereof. Particularly preferred organic solvents are methanol, acetone, propan-2-ol and compositions comprising two or more thereof.

The composition preferably comprises inert solvent in an amount of at least 2 wt %, more preferably at least 5 wt %, e.g. at least 6 wt % or at least 10 wt %. The composition preferably comprises inert solvent in an amount of less than 45 wt %, more preferably less than 40 wt %, e.g. less than 30 wt %. In certain preferred embodiments the composition preferably comprises inert solvent in an amount of 5 to 40 wt %, more preferably 8 to 36 wt % and especially 10 to 35 wt %.

When the inert solvent comprises water and an organic solvent the weight ratio of water:organic solvent is preferably between 10:1 and 1:2, more preferably between 4:1 and 1:1 and especially between 3:1 and 2:1.

The organic solvent is optionally a single organic solvent or a combination of two or more organic solvents.

In one embodiment the composition comprises less than 10 wt %, more preferably less than 5 wt %, of ethylenically unsaturated compounds other than components a) and b). In a preferred embodiment the composition is free from ethylenically unsaturated compounds other than components a) and b).

Preferably the composition has a pH of 0 to 11.

The pH of the composition depends to some extent on whether the anionic group is in the free acid or salt form. When the anionic group is partly in the free acid form the composition preferably has a pH of 0.2 to 7, more preferably 0.5 to 2.5, especially about 1.5.

In one embodiment the composition is free from radical initiators. In another embodiment the composition comprises a radical initiator.

When the composition is free from radical initiator it may be cured using electron beam radiation.

Preferably, however, the composition comprises 0.01 to 10 wt %, more preferably 0.05 to 5 wt %, especially 0.1 to 2 wt % radical initiator. The preferred radical initiator is a photoinitiator.

The radical initiator is often referred to as component e) in this specification.

The curable composition may comprise one or more than one radical initiator as component e).

When the composition comprises an acrylamide, diacrylamide, or higher-acrylamide, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, ethyl(2,4,6-trimethylbenzoyl)-phenyl phosphinate and bis(2,4,6-trimethylbenzoyl)-phenylphosphine oxide.

When a radical initiator is present in the composition, preferably a polymerization inhibitor is also included (e.g. in an amount of below 2 wt %). This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 510, Genorad™ polymerisation inhibitors and mixtures comprising two or more of the foregoing.

The curable composition may contain other components, for example acids, pH controllers, preservatives, viscosity modifiers, stabilisers, dispersing agents, antifoam agents, monomers free from anionic groups, organic/inorganic salts, anionic, cationic, non-ionic and/or amphoteric surfactants and the like.

The curable composition may of course contain further components not specifically mentioned or excluded above.

In view of the foregoing, the curable composition preferably comprises
a) 20 to 55 wt % of curable compound comprising one ethylenically unsaturated group and a sulpho group;
b) 12 to 55 wt % crosslinking agent comprising at least two acrylic groups;
c) 4 to 30 wt % tertiary amine;
d) 5 to 40 wt % of inert solvent; and
e) 0.1 to 2 wt % radical initiator;
wherein the molar ratio of component c) to a) is at least 0.9.

Preferably the composition is free from, or substantially free from, methacrylic compounds (e.g. methacrylate and methacrylamide compounds), i.e. the composition comprises at most 10 wt % of compounds comprising one or more methacrylic groups.

Preferably the composition is free from, or substantially free from, divinyl benzene and derivatives thereof.

Preferably the composition is free from, or substantially free from, styrene and derivatives thereof.

Preferably the composition is free from, or substantially free from, metal salts, e.g. free from lithium nitrate, lithium hydroxide and calcium nitrate.

Preferably the composition is free from, or substantially free from, dyes and pigments. This is because there is no need to include dyes or pigments in the composition.

Substantially free from means less than 10 wt %, preferably less than 5 wt %, especially less than 2 wt %, of the compound.

Thus the preferred composition is free from, or substantially free from, divinyl benzene, dyes, pigments, styrene, methacrylic compounds and compounds having tetralkyl-substituted quaternary ammonium groups.

According to a second aspect of the present invention there is provided a process for preparing a membrane comprising the following steps:
a) applying a curable composition to a support; and
b) curing the composition to form a membrane;
wherein the composition is as defined in the first aspect of the present invention.

Hitherto membranes have often been made in slow and energy intensive processes, often having many stages. The present invention enables the manufacture of membranes in a simple process that may be run continuously for long periods of time to mass produce membranes relatively cheaply.

Optionally the process comprises the further step of separating the cured composition and support. However if desired this further step may be omitted and thereby a composite membrane is produced comprising the cured composition and a porous support.

The thickness of the membrane, including the support, when present, is preferably less than 250 µm, more preferably between 10 and 200 µm, most preferably between 20 and 150 µm.

Preferably the membrane has a calculated ion exchange capacity ("IEC") of at least 0.1 meq/g, more preferably of at least 0.3 meq/g, especially more than 0.6 meq/g, more especially more than 1.0 meq/g, particularly more than 3.5 meq/g of total dry weight of the composition. IEC's towards the upper end of these ranges are preferred in order to reduce the electrical resistance of the resultant membrane. The resultant IEC is expressed as milli-equivalents per gram of dry (i.e. solvent-free) composition (meq/g). Any solvents present in the composition, including any non-curable diluents or waters of crystallisation present in any ingredient used to make the composition, are therefore excluded from the calculation of IEC.

Preferably the membrane has a permselectivity for small cations (e.g. $Na^+$) of more than 80%, more preferably more than 85%, especially more than 90% and more especially more than 95%.

Preferably the membrane has an electrical resistance less than 5 ohm·$cm^2$, most preferably less than 3 ohm·$cm^2$. The electrical resistance may be determined by the method described below in the examples section.

Preferably the membrane exhibits a % weight loss when ultrasonicated for 99 minutes and broken-off parts of the membrane are removed, of less than 3%, more preferably less than 1%. The % weight loss can be controlled by, for example, selecting appropriate amounts of components a) and b) and by adjusting appropriate parameters in the curing step.

Electrical resistance and permselectivity may be measured by the methods described by Djugolecki et al, J. of Membrane Science, 319 (2008) on pages 217-218.

Typically the ion exchange membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 2 nm, more preferably smaller than 1 nm.

The resultant membrane preferably has a low water permeability so that ions may pass through the membrane and water molecules do not pas through the membrane. Preferably the membrane's water permeability is lower than $1 \times 10^{-7}$ $m^3/m^2 \cdot s \cdot kPa$, more preferably lower than $1 \times 10^{-8}$ $m^3/m^2 \cdot s \cdot kPa$, most preferably lower than $1 \times 10^{-9}$ $m^3/m^2 \cdot s \cdot kPa$, especially lower than $1 \times 10^{-10}$ $m^3/m^2 \cdot s \cdot kPa$. The requirements for water permeability depend on the intended use of the membrane.

Where desired, a surfactant or combination of surfactants may be included in the composition as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants are as described in WO 2007/018425, page 20, line 15 to page 22, line 6, which are incorporated herein by reference thereto. Fluorosurfactants are particularly preferred, especially Zonyl® FSN and Capstone® fluorosurfactants (produced by E.I. Du Pont).

Preferably the components of the composition are selected such that no phase separation occurs during the curing step. In this way, the likelihood of a porous structure in the resultant membrane is reduced.

The network structure of the membrane is determined to a large extent by the identity of the crosslinking agent(s) and the curable compound and their functionality, e.g. the number of crosslinkable groups they contain per molecule.

During application of the composition to a support, the composition may form a layer on top of the support, or it may permeate wholly or partially into the pores of the support thereby forming an impregnated composite membrane after curing. The composition may also be applied to both sides of the support to achieve a symmetrical composite membrane. In a preferred embodiment the support is saturated with the composition and the saturated support is cured by EB or UV irradiation.

The process of the present invention may contain further steps if desired, for example washing and/or drying the resultant membrane.

Before applying the composition to the surface of the support, the support may be subjected to a corona discharge treatment, plasma glow discharge treatment, flame treatment, ultraviolet light irradiation treatment, chemical treatment or the like, e.g. for the purpose of improving its wettability and the adhesiveness.

The support may also be treated to modify its surface energy, e.g. to values above 70 mN/m.

While it is possible to prepare the membrane on a batch basis using a stationary support, to gain full advantage of the invention it is much preferred to prepare the membrane on a continuous basis using a moving support. The support may be in the form of a roll which is unwound continuously or the support may rest on a continuously driven belt (or a combination of these methods). Using such techniques the composition can be applied to the support on a continuous basis or it can be applied on a large batch basis.

The composition may be applied to the support by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating. The coating of multiple layers can be done simultaneously or consecutively. For simultaneous coating of multiple layers, curtain coating, slide coating and slot die coating are preferred.

In one embodiment at least two compositions according to a first aspect of the present invention are applied to the support, e.g. simultaneously or consecutively. The at least two compositions may be the same as each other or different from each other. The compositions may be applied to the same side of the support or to different sides. Thus the application step may be performed more than once, either with or without curing being performed between each application. When applied to different sides the resultant composite membrane may be symmetrical or asymmetrical and the layers of the composition may have the same or different thicknesses. When applied to the same side a composite membrane may be formed comprising at least one top layer and at least one bottom layer that is closer to the support than the top layer. In this embodiment the top layer and bottom layer, together with any intervening layers, constitute the membrane and the porous support provides strength to the resultant composite membrane.

Thus in a preferred process, the composition is applied continuously to a moving support, more preferably by means of a manufacturing unit comprising one or more composition application station(s), one or more irradiation source(s) for curing the composition, a membrane collecting station and a means for moving the support from the composition application station(s) to the irradiation source(s) and to the membrane collecting station.

The composition application station(s) may be located at an upstream position relative to the irradiation source(s) and the irradiation source(s) is/are located at an upstream position relative to the membrane collecting station.

In order to produce a sufficiently flowable composition for application by a high speed coating machine, it is preferred that the composition has a viscosity below 12,000 mPa·s when measured at 50° C., more preferably from 1 to 4,000 mPa·s when measured at 50° C. Most preferably the viscosity of the composition is from 2 to 500 mPa·s when measured at 50° C. For coating methods such as slide bead coating the preferred viscosity is from 2 to 150 mPa·s when measured at 50° C.

With suitable coating techniques, the composition may be applied to a support moving at a speed of over 5 m/min, preferably over 10 m/min, more preferably over 15 m/min, e.g. more than 20 m/min, or even higher speeds, such as 30 m/min, or up to 100 m/min can be reached.

Curing is preferably performed by radical polymerisation, preferably using electromagnetic radiation. The source of radiation may be any source which provides the wavelength and intensity of radiation necessary to cure the composition. A typical example of a UV light source for curing is a D-bulb with an output of 600 Watts/inch (240 W/cm) as supplied by Fusion UV Systems. Alternatives are the V-bulb and the H-bulb from the same supplier.

When no photoinitiator is included in the composition, the composition can be cured by electron-beam exposure, e.g. using an exposure of 50 to 300 keV. Curing can also be achieved by plasma or corona exposure.

During curing the components a) and b) (when present) polymerise to form a polymeric membrane. The curing may be brought about by any suitable means, e.g. by irradiation and/or heating. Preferably curing occurs sufficiently rapidly to form a membrane within 30 seconds. If desired further curing may be applied subsequently to finish off, although generally this is not necessary.

The curing is preferably achieved thermally (e.g. by irradiating with infrared light) or, more preferably, by irradiating the composition with ultraviolet light or an electron beam.

For thermal curing the composition preferably comprises one or more thermally reactive free radical initiators, preferably being present in an amount of 0.01 to 5 parts per 100 parts of the curable composition, wherein all parts are by weight.

Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. α,α'-azobisisobutyronitrile and/or γ,γ'-azobis(γ-cyanovaleric acid); persulfates; peracetates, e.g. methyl peracetate and/or tert-butyl peracetate; peroxalates, e.g. dimethyl peroxalate and/ or di(tert-butyl) peroxalate; disulfides, e.g. dimethyl thiuramdisulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably curing of the composition begins within 3 minutes, more preferably within 60 seconds, of the composition being applied to the support.

Preferably the curing is achieved by irradiating the composition for less than 30 seconds, more preferably less than 10 seconds, especially less than 3 seconds, more especially less than 2 seconds, e.g. between 0.1 and 1 second. In a continuous process the irradiation occurs continuously and the speed at which the composition moves through the beam of irradiation is mainly what determines the time period of curing.

Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photo-initiator included in the curable composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 1500 mJ/cm$^2$, most preferably between 70 and 900 mJ/cm$^2$ as measured by a High Energy UV Radiometer (UV PowerMap™ from EIT, Inc) in the UV-A and UV-B range indicated by the apparatus.

To reach the desired exposure dose at high coating speeds, more than one UV lamp may be used, so that the composition is irradiated more than once. When two or more lamps are used, all lamps may give an equal dose or each lamp may have an individual setting. For instance the first lamp may give a higher dose than the second and following lamps or the exposure intensity of the first lamp may be lower. Varying the exposure dose of each lamp may influence the polymer matrix structure and the final crosslink density. In a preferred embodiment the composition is cured by simultaneous irradiation from opposite sides using two or more irradiation sources, e.g. two lamps (one at each side). The two or more irradiation sources preferably irradiate the composition with the same intensity as each other. By using this symmetric configuration, a higher crosslinking efficiency can be achieved and curling of the membrane can be reduced or prevented.

Curing is preferably performed at between 20 and 60° C. While higher temperatures may be used, these are not preferred because they can lead to higher manufacturing costs.

Preferred supports are porous, e.g. they may be a woven or non-woven synthetic fabric or extruded netting, e.g. polyethylene, polypropylene, polyacrylonitrile, polyvinyl chloride, polyester, polyimide, and copolymers thereof, or porous membranes based on e.g. polysulfone, polyethersulfone, polyphenylenesulfone, polyphenylenesulfide, polyimide, polyetherimide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene, polychlorotrifluoroethylene, and copolymers thereof.

Commercially available porous supports are available from a number of sources, e.g. from Freudenberg Filtration Technologies (Novatexx materials) and Sefar AG.

The present process allows the preparation of membranes having a desirable degree of flexibility, without being overly flexible or too rigid. The compositions can provide thin membranes with low numbers of defects, low tendency to curl while retaining good durability in use.

According to a third aspect of the present invention there is provided a membrane obtained by a process according to the second aspect of the present invention.

The membranes according to the third aspect of the present invention may also be put to other uses requiring membranes having anionic groups.

The membranes according to the third aspect of the present invention preferably have the properties described above in relation to the second aspect of the present invention.

According to a fourth aspect of the present invention there is provided use of a membrane according to the third aspect of the present invention for the separation or purification of liquids, vapours or gases.

The membranes of the invention are particularly useful for water purification, the treatment of blowdown water in cooling tower systems and/or the generation of electricity etc. for example in ED, (C) EDI, EDR, FTC, ZLD, ZDD or RED, although they may also be used for other purposes.

According to a fifth aspect of the present invention there is provided an electrodialysis or reverse electrodialysis unit, a flow through capacitor device, an electrodeionization module, a continuous electrodeionization module, a fuel cell, a diffusion dialysis apparatus, a membrane distillation module or a membrane electrode assembly comprising one or more polymeric membranes according to the present invention.

Preferably the electrodialysis (ED) or reverse electrodialysis (RED) unit or the electrodeionization (EDI) module or the flow through capacitor comprises at least one anode, at least one cathode and one or more membranes according to the third aspect of the present invention. Preferred RED units comprise an inlet for providing a flow of water having a relatively high salt content along a first side of a membrane according to the present invention and an inlet for providing a flow of water having a relatively low salt content along a second side of the membrane such that ions pass from the first side to the second side of the membrane. Preferably the one or more membranes of the RED unit comprise a membrane according to the first or third aspect of the present invention having anionic groups and a further membrane having cationic groups.

In a preferred embodiment the unit comprises at least 3, more preferably at least 5, e.g. 36, 64 or up to 500 or even 1000, membranes according to the first or third aspect of the present invention, the number of membranes being dependent on the application. The membrane may for instance be used in a plate-and-frame or stacked-disk configuration or in a spiral-wound design. Alternatively, a continuous first membrane according to the present invention having anionic groups may be folded in a concertina (or zigzag) manner and a second membrane having cationic groups (i.e. of opposite charge to the first membrane) may be inserted between the folds to form a plurality of channels along which fluid may pass and having alternate anionic and cationic membranes as side walls.

The invention will now be illustrated with non-limiting examples where all parts and percentages are by weight unless specified otherwise.

In the examples the following properties were measured by the methods described below.

General Test Methods

Permselectivity ("PS") α was measured by using a static membrane potential measurement. Two cells were separated by the membrane under investigation. Prior to the measurement the membrane was equilibrated in a 0.05 M KCl solution for at least 16 hours. Two streams having different KCl concentrations were passed through cells on opposite sides of the membranes under investigation. One stream had a concentration of 0.05M KCl (from Sigma Aldrich, min. 99.0% purity) and the other stream was 0.5 M KCl. The flow rate of both streams was 0.5 L/min (using a Cole Parmer Masterflex console drive (77521-47) with easy load II model 77200-62 gear pumps). Two Ag/AgCl reference electrodes type 6.0750.100 (from Metrohm AG, Switzerland) filled with 3M KCl were connected to Haber-Luggin capillary tubes that were inserted in each cell and were used to measure the potential difference over the membrane. The effective membrane area was 9.62 cm$^2$ and the temperature was 21° C.

When a steady state was reached, the membrane potential ($\Delta V_{meas}$) was measured.

The permselectivity (α (%)) of the membrane was calculated according the formula:

$$\alpha(\%) = \Delta V_{meas}/\Delta V_{theor} * 100\%.$$

The theoretical membrane potential ($\Delta V_{theor}$) is the potential for a 100% permselective membrane as calculated using the Nernst equation.

The measured values were corrected for the (constant) potential deviation between the two reference electrodes.

Electrical resistance ("ER") (ohm·cm$^2$) was measured by the method described by Djugolecki et al, J. of Membrane Science, 319 (2008) on page 217-218 with the following modifications:

the auxiliary membranes were CMX and AMX from Tokuyama Soda, Japan;
the capillaries as well as the Ag/AgCl references electrodes (Metrohm type 6.0750.100) contained 3M KCl;
the calibration liquid and the liquid in compartment 2, 3, 4 and 5 was 0.5 M NaCl;
the effective membrane area was 9.62 cm2;
the distance between the capillaries was 5.0 mm;
the measuring temperature was 25.0° C.;
a Cole Parmermasterflex console drive (77521-47) with easy load II model 77200-62 gear pumps was used for all compartments;
the flowrate of each stream was 475 ml/min controlled by Porter Instrument flowmeters (type 150AV-B250-4RVS) and Cole Parmer flowmeters (type G-30217-90).

pH measurements were performed using a Metrohm 691 pH meter equipped with a Metrohm 6.0228.000 electrode, calibrated at 20° C. with standard buffers of pH 4 and 7.

Viscosity measurements were performed using an oscillation rheometer (Anton Paar, Rheoplus Physica MCR301) cone-plate, with a diameter of 50 mm (CP50) and angel cone of 1°. The bottom plate of the rheometer was heated to 23° C. Space between the tip of the cone and plate was 49 μm and the force on the plates was set on 0 N. The cone was rotated and the shear rate was increased from 0.001 s$^{-1}$ to 1000 s$^{-1}$ with 6 point per decade (total 31 measuring points). The time to measure a point was 10 s.

The solubility of the crosslinking agents in water in mol/l at 25° C. ($S_w$) was determined by calculating the anti log of log $S_w$, wherein log $S_w$ was determined as described below.

Log $S_w$ was determined using the method described by Jain et al, J. Pharm. Sc., 90, 2, 2001, 234-252, according the Formula (1):

$$\log S_w = (0.5 - 0.01(mp-25) - \log K_m) \quad \text{Formula (1)}$$

wherein:

log $S_w$ is the log of the solubility of the crosslinking agent in water in mol/l;

mp is melting point of the crosslinking agent in ° C.; and $K_{ow}$ is the octanol-water partition coefficient of the crosslinking agent.

In the above formula, log refers to $\log_{10}$.

For crosslinking agents which are liquid at 25° C., a value of 25 was used for mp, resulting in the Formula (1a):

$$\log S_w = (0.5 - \log_{10} K_{ow}) \quad \text{Formula (1a)}$$

The octanol-water partition coefficient was measured using the general method described in the OECD guidelines for the testing of chemicals no. 117: 'Partition Coefficient (n-octanol/water), High Performance Liquid Chromatograph (HPLC) Method', adopted 13 Apr. 2004.

The abovementioned general method uses a set of reference substances the log $K_{ow}$ of which are known. These "reference" $K_m$ values were obtained from the OECD guideline mentioned above and from James Sangster, J. Phys. Chem. Ref. Data, Vol. 18, No. 3, 1989, p. 1111-1229 and are given in the Table 1 below:

TABLE 1

| Reference Substance | log $K_{ow}$ |
|---|---|
| Formamide | −1.51 |
| Acetamide | −1.26 |
| Acrylamide | −0.78 |
| n-Methylbenzamide | 0.86 |
| m-Cresol | 1.96 |
| Benzanilide | 2.62 |
| Toluene | 2.7 |
| Ethylbenzene | 3.2 |
| n-butylbenzene | 4.6 |
| Fluoranthene | 5.1 |

When measuring the log $K_{ow}$ for TCD and CD536, the reference substances were m-cresol, toluene, ethylbenzene, n-butylbenzene and fluoranthene. When measuring the log $K_{ow}$ for SR-259, the reference substances were formamide, acetamide, acrylamide, N-methylbenzamide, m-cresol and benzenalide.

The HPLC instrument used in the above method was an Acquity UPC HPLC system from Waters, Millford, USA, using a photo diode array detector at a wavelength of 210 nm. The instrument settings were adapted to the type of crosslinking agent as described in Table 2:

TABLE 2

| Instrument settings | (Crosslinking agent) | |
| --- | --- | --- |
| | A (TCD, CD536) | B (SR259) |
| Flow (ml/min) | 0.8 | 0.4 |
| Column | Waters, BEH C18, dp 1.7 µm, 50 × 2.1 mm | Alltech adsorbosphere UHS C18 5 µm, 150 × 3.2 mm |
| Column temp (° C.) | 45 | 5 |
| Injection vol. (µl) | 1 | 5 |
| Eluent | 70% A2 methanol + 0.1% acetic acid/30% B2 Milli-Q + 0.1% acetic acid | 60% A2 methanol/40% B2 ammonium acetate 10 mM pH 7 |
| Run time (min) | 3 | 50 |

The reference substances and crosslinking agents were dissolved in methanol to obtain a concentration of 50 mg/l.

Log $K_m$, as used in Formula (1) and (1a), was calculated in accordance with Formula (2):

$$\log K_{ow} = a + (b \times \log_{10} k) \quad \text{Formula (2)}$$

wherein:
a and b are the linear regression coefficients; and
k is the capacity factor.

In order to perform the calculation shown in Formula (2) above for the crosslinking agents, it was necessary to determine the values of a and b. The values of a and b were determined graphically from the plot of the known log $K_{ow}$ values for the reference substances and the measured capacity factors k.

The capacity factor (k), as used in Formula (2) above, was determined in accordance with Formula (3) below (as indicated in the OECD guideline mentioned above):

$$k = (t_R - t_0)/t_0 \quad \text{Formula (3)}$$

wherein:
$t_R$ is the retention time of the reference substance through the HPLC column; and
$t_0$ is the dead-time, i.e. the average time a solvent molecule takes to pass through the HPLC column.

The values of linear regression coefficients a and b for instrument settings A and B used in these Examples are shown in Table 3 below:

TABLE 3

| Instrument Setting | a | b |
| --- | --- | --- |
| A | 1.9535 | 3.0476 |
| B | 1.1805 | 2.9273 |

For the crosslinking agents also the capacity factor k was determined from the measured retention time and by using Formula 2 the corresponding log $K_{ow}$. The resultant Sw values (calculated from the antilog of log $S_w$, wherein log $S_w$ was determined in accordance with Formula (1) or (1a)) are shown in the final column of Table 4 below:

TABLE 4

| Crosslinking agent | $\log_{10} K_{ow}$ | mp (° C.) | $\log_{10} S_w$ | $S_w$ (mol/l) |
| --- | --- | --- | --- | --- |
| TCD | 4.43 | Liquid = 25 | −3.93 | 0.0001 |
| CD536 | 3.65 | Liquid = 25 | −3.15 | 0.0007 |
| SR259 | 1.56 | Liquid = 25 | −1.06 | 0.087 |

MBA has a solubility in water of 22 g/L (0.14 mol/L) at 25° C.

TABLE 5

Ingredients used in the Examples and Comparative Examples

| Component Category | Abbreviation | identity |
| --- | --- | --- |
| a) | AMPS | 2-acryloylamido-2-methylpropanesulfonic acid |
| b) | TCD | tricyclo(5.2.1.0(2,6))dec-anedimethanoldiacrylate |
| | CD536 | dioxane glycol diacrylate |
| | MBA | N,N-methylene bis(acrylamide) |
| | SR259 | polyethyleneglycol diacrylate |
| c) | TEA | triethylamine |
| | MIm | 1-methylimidazole |
| | BIm | 1-butylimidazole |
| | Epip | 1-ethyl piperidine |
| d) | DMSO | dimethyl sulphoxide |
| | Acetone | propanone |
| | IPA | propan-2-ol |
| | MeOH | methanol |
| | Water | water |
| e) | HDMAP | 2-hydroxy-2-methyl-1-phenyl-propan-1-one |
| Other (stabiliser) | Genorad ™ 16 | n/a |

Novatexx™ 2226-14E—is a nonwoven polypropylene/polyethylene material from Freudenberg Filtration Technologies.

EXAMPLES 1 TO 15 AND COMPARATIVE EXAMPLES 1 AND 2

Compositions Ex 1 to Ex 15 and comparative compositions CE1 and CE2 were prepared by mixing the ingredients expressed as wt % shown in Tables 6, 7 and 8.

The resultant compositions were applied to an aluminium support using a 150 µm wire wound bar, at a speed of approximately 5 m/min, by hand, followed by application of a non-woven support (Novatexx™ 2226-14E). The non-woven support was completely soaked with the composition and subsequently leveled using a 4 micrometer wire wound rod coater. The temperature of the compositions was about 20° C. (ambient temperature) except where indicated differently.

A membrane was prepared by curing the coated support using a Light Hammer LH6 from Fusion UV Systems fitted with a D-bulb working at 100% intensity with a speed of 30 m/min (single pass). The exposure time was 0.47 seconds.

After curing, the membrane was stored in a 0.1 M NaCl solution for at least 12 hours.

TABLE 6

| Cmp | | Ex1 | Ex2 | Ex3 | Ex4 | Ex5 | Ex6 | Ex7 |
| --- | --- | --- | --- | --- | --- | --- | --- | --- |
| a) | AMPS | 36.8 | 27.8 | 37.3 | 36.2 | 41.2 | 33.3 | 35.9 |
| b) | TCD | 27.1 | 0 | 0 | 0 | 0 | 0 | 0 |
| | CD536 | 0 | 21.9 | 29.3 | 28.1 | 32.0 | 26.0 | 27.9 |
| c) | BIm | 22.1 | 0 | 22.3 | 0 | 0 | 20.0 | 0 |
| | MIm | 0 | 11.0 | 0 | 0 | 0 | 0 | 0 |
| | TEA | 0 | 0 | 0 | 17.4 | 19.9 | 0 | 0 |
| | Epip | 0 | 0 | 0 | 0 | 0 | 0 | 19.6 |
| d) | DMSO | 13.0 | 38.5 | 0 | 0 | 0 | 0 | 0 |
| | MeOH | 0 | 0 | 10.4 | 17.7 | 0 | 20.0 | 16.0 |
| | Acetone | 0 | 0 | 0 | 0 | 6.1 | 0 | 0 |
| e) | HDMAP | 0.5 | 0.4 | 0.6 | 0.5 | 0.6 | 0.5 | 0.5 |
| | Genorad | 0.5 | 0.4 | 0.1 | 0.1 | 0.2 | 0.2 | 0.1 |

TABLE 6-continued

| Cmp | | Ex1 | Ex2 | Ex3 | Ex4 | Ex5 | Ex6 | Ex7 |
|---|---|---|---|---|---|---|---|---|
| Molar ratio c)/a) | | 1.00 | 1.00 | 1.00 | 0.99 | 0.99 | 1.00 | 1.00 |
| | α (%) | 90.2 | 89.8 | 92.1 | 90.7 | 89.2 | 90.0 | 90.1 |
| | ER (ohm · cm$^2$) | 3.4 | 3.3 | 3.6 | 3.8 | 3.5 | 3.9 | 4.7 |

TABLE 7

| Cmp | | Ex8 | Ex9 | Ex10 | Ex11 | Ex12 | Ex13 | Ex14 |
|---|---|---|---|---|---|---|---|---|
| a) | AMPS | 44.5 | 44.5 | 44.5 | 38.8 | 40.6 | 38.8 | 40.6 |
| b) | MBA | 16.0 | 16.0 | 16.0 | 0 | 0 | 0 | 0 |
| | SR259 | 8.3 | 0 | 0 | 0 | 0 | 0 | 0 |
| | TCD | 0 | 8.3 | 0 | 0 | 0 | 0 | 0 |
| | CD536 | 0 | 0 | 8.3 | 30.2 | 31.5 | 30.2 | 31.5 |
| c) | MIm | 17.7 | 17.7 | 17.7 | 0 | 0 | 0 | 0 |
| | TEA | 0 | 0 | 0 | 18.7 | 15.1 | 18.7 | 15.1 |
| d) | Water | 12.5 | 12.5 | 0 | 0 | 0 | 0 | 0 |
| | MeOH | 0 | 0 | 12.5 | 11.6 | 12.1 | 0 | 0 |
| | Acetone | 0 | 0 | 0 | 0 | 0 | 11.6 | 12.1 |
| e) | HDMAP | 0.7 | 0.7 | 0.7 | 0.6 | 0.6 | 0.6 | 0.6 |
| | Genorad | 0.3 | 0.3 | 0.3 | 0.1 | 0.1 | 0.1 | 0.1 |
| Viscosity (mPa · s) | | — | — | — | 213 | — | 387 | — |
| Molar ratio c)/a) | | 1.00 | 1.00 | 1.00 | 0.99 | 0.76 | 0.99 | 0.76 |
| | α (%) | 90.4 | 91.3 | 89.2 | 92.3 | 93.5 | 93.4 | 93.5 |
| | ER (ohm · cm$^2$) | 5.8 | 5.3 | 5.6 | 4.7 | 5.7 | 5.2 | 5.3 |

The composition of Ex8, Ex9 and Ex10 were dissolved at a temperature of 90° C. and coated at a temperature of 65° C.

TABLE 8

| Cmp | | Ex15 | CE1 | CE2 |
|---|---|---|---|---|
| a) | AMPS | 37.5 | 37.5 | 43.2 |
| b) | MBA | 0 | 0 | 16.3 |
| | SR259 | 0 | 0 | 0 |
| | TCD | 28.1 | 28.1 | 0 |
| c) | BIm | 22.5 | 0 | 0 |
| d) | Water | 0 | 0 | 15.2 |
| | MeOH | 11.2 | 33.7 | 0 |
| | IPA | 0 | 0 | 15.7 |
| e) | HDMAP | 0.6 | 0.6 | 0.5 |
| | Genorad | 0.1 | 0.1 | 0.5 |
| | LiOH•H$_2$O | 0 | 0 | 8.6 |
| Viscosity (mPa · s) | | 371 | >10$^5$ | — |
| Molar ratio c)/a) | | 1.00 | 0 | 0 |
| α (%) | | 89.7 | — | 93.2 |
| ER (ohm · cm$^2$) | | 3.8 | — | 3.6 |

Cmp is an abbreviation for "component", Ex is an abbreviation for "Example" and CE is an abbreviation for "Comparative Example".

The viscosity of composition of CE1 was too high to achieve a defect free coating layer (no membrane could be made).

CE2 required the use of LiOH.H$_2$O to obtain a homogeneous composition which is not preferred.

A membrane made with SR259 as the only crosslinking agent showed good initial properties but was less stable at pH4 and pH8 than membranes comprising a crosslinking agent that had a solubility in water of less than 0.03 mol/l.

The α (%) and ER of a reference membrane (CMX of Astom, Japan) were measured and were found to be 95.3% and 4.1 ohm·cm$^2$.

The invention claimed is:

1. A curable composition comprising:
   a) 5 to 65 wt % of curable compound comprising one ethylenically unsaturated group and at least one anionic group;
   b) 2.5 to 70 wt % of crosslinking agent comprising at least two acrylic groups;
   c) a tertiary amine; and
   d) 0 to 45 wt % of inert solvent;
   wherein the molar ratio of component c) to a) is at least 0.7.

2. The composition according to claim 1 wherein the molar ratio of component c) to a) is at least 0.9.

3. The composition according to claim 1 wherein the crosslinking agent has a melting point below 80° C., when measured at atmospheric pressure.

4. The composition according to claim 1 wherein the anionic group is selected from sulpho, carboxy and phosphato groups.

5. The composition according to claim 1 wherein the anionic group is a sulpho group.

6. The composition according to claim 1 which comprises at least 5 wt % and less than 70 wt % of the said crosslinking agent.

7. The composition according to claim 1 wherein the said crosslinking agent has a solubility in water of less than 0.03 mol/l, when measured at 25° C.

8. The composition according to claim 1 wherein the weight ratio of component b) to component a) is greater than 0.3.

9. The composition according to claim 1 which further comprises 0.05 to 10 wt % of photoinitiator.

10. The composition according to claim 1 wherein the said crosslinking agent comprises at least two groups selected from acrylamide groups.

11. The composition according to claim 1 wherein the said tertiary amine has a melting point below 50° C.

12. The composition according to claim 1 wherein the said tertiary amine is selected from tri($C_{1-12}$-alkyl)amines and heterocyclic N—($C_{1-12}$-alkyl) amines.

13. The composition according to claim 1 wherein the said curable compound has a MW of less than 1000 Dalton and/or said crosslinking agent has a MW of less than 1000 Dalton.

14. The composition according to claim 1 wherein the said tertiary amine has a MW of less than 400 Dalton.

15. The composition according to claim 1 which has a viscosity of below 12 Pa.s when measured at 50° C.

16. A process for preparing a membrane comprising the following steps:
   a) applying a curable composition to a support; and
   b) curing the composition to form a membrane;
   wherein the composition is as defined in claim 1.

17. The process according to claim 16 wherein the curing is performed by a process comprising irradiating the composition for less than 30 seconds.

18. A cation exchange membrane including a cured composition comprising, prior to curing,
   a) 5 to 65 wt % of curable compound comprising one ethylenically unsaturated group and at least one anionic group;
   b) 2.5 to 70 wt % of crosslinking agent comprising at least two acrylic groups;
   c) a tertiary amine; and
   d) 0 to 45 wt % of inert solvent;
   wherein the molar ratio of component c) to a) is at least 0.7.

19. An electrodialysis or reverse electrodialysis unit, a flow through capacitor device, an electrodeionization module, a continuous electrodeionization module, a fuel cell, a diffusion dialysis apparatus, a membrane distillation module or a membrane electrode assembly comprising one or more membranes including a cured composition comprising, prior to curing,
- a) 5 to 65 wt % of curable compound comprising one ethylenically unsaturated group and at least one anionic group;
- b) 2.5 to 70 wt % of crosslinking agent comprising at least two acrylic groups;
- c) a tertiary amine; and
- d) 0 to 45 wt % of inert solvent;

wherein the molar ratio of component c) to a) is at least 0.7.

20. The composition according to claim 1 wherein:
- (a) the crosslinking agent has (i) a melting point below 80° C., when measured at atmospheric pressure; and (ii) a solubility in water of less than 0.03 mol/l, when measured at 25° C.;
- (b) the composition comprises at least 5 wt % and less than 70 wt % of the said crosslinking agent;
- (c) the composition further comprises 0.05 to 10 wt % of photoinitiator;
- (d) the weight ratio of component b) to component a) is greater than 0.3; and
- (e) the anionic group is a sulpho group.

21. The composition according to claim 1 wherein:
- (a) the said tertiary amine has a melting point below 50° C.;
- (b) the said tertiary amine is selected from tri($C_{1-12}$-alkyl) amines and heterocyclic N—($C_{1-12}$-alkyl) amines; and
- (c) the said curable compound has a MW of less than 1000 Dalton;
- (d) the said crosslinking agent has a MW of less than 1000 Dalton; and
- (e) the said tertiary amine has a MW of less than 400 Dalton.

22. The composition according to claim 1 wherein:
- (a) the crosslinking agent has a melting point below 80° C., when measured at atmospheric pressure;
- (b) the anionic group is a sulpho group;
- (c) the composition comprises at least 5 wt % and less than 70 wt % of the said crosslinking agent;
- (d) the said crosslinking agent has a solubility in water of less than 0.03 mol/l, when measured at 25° C., and has a MW of less than 1000 Dalton;
- (e) the weight ratio of component b) to component a) is greater than 0.3; and
- (f) the composition comprises 0.05 to 10 wt % of photoinitiator;
- (g) the said tertiary amine is selected from tri($C_{1-12}$-alkyl) amines and heterocyclic N—($C_{1-12}$-alkyl) amines and has a melting point below 50° C. and a MW of less than 400 Dalton; and
- (h) the said curable compound has a MW of less than 1000 Dalton.

23. The process according to claim 16 wherein:
- (a) the composition comprises a crosslinking agent having a melting point below 80° C., when measured at atmospheric pressure;
- (b) the anionic group is a sulpho group;
- (c) the composition comprises at least 5 wt % and less than 70 wt % of the said crosslinking agent;
- (d) the said crosslinking agent has a solubility in water of less than 0.03 mol/l, when measured at 25° C. and has a MW of less than 1000 Dalton;
- (e) the weight ratio of component b) to component a) is greater than 0.3;
- (f) the composition comprises 0.05 to 10 wt % of photoinitiator;
- (g) the said tertiary amine is selected from tri($C_{1-12}$-alkyl) amines and heterocyclic N—($C_{1-12}$-alkyl) amines and has a melting point below 50° C. and a MW of less than 400 Dalton; and
- (h) the said curable compound has a MW of less than 1000 Dalton.

24. A cation exchange membrane including a cured composition comprising, prior to curing,
- a) 5 to 65 wt % of curable compound comprising one ethylenically unsaturated group and at least one anionic group;
- b) 2.5 to 70 wt % of crosslinking agent comprising at least two acrylic groups;
- c) a tertiary amine; and
- d) 0 to 45 wt % of inert solvent;

wherein the molar ratio of component c) to a) is at least 0.7, wherein
- (e) the composition comprises a crosslinking agent having a melting point below 80° C., when measured at atmospheric pressure;
- (f) the anionic group is a sulpho group;
- (g) the composition comprises at least 5 wt % and less than 70 wt % of the said crosslinking agent;
- (h) the said crosslinking agent has a solubility in water of less than 0.03 mol/l, when measured at 25° C. and has a MW of less than 1000 Dalton;
- (i) the weight ratio of component b) to component a) is greater than 0.3;
- (j) the composition comprises 0.05 to 10 wt % of photoinitiator;
- (k) the said tertiary amine is selected from tri($C_{1-12}$-alkyl) amines and heterocyclic N—($C_{1-12}$-alkyl) amines and has a melting point below 50° C. and a MW of less than 400 Dalton; and
- (l) the said curable compound has a MW of less than 1000 Dalton.

25. A cation exchange membrane including a cured composition comprising, prior to curing,
- a) 5 to 65 wt % of curable compound comprising one ethylenically unsaturated group and at least one anionic group;
- b) 2.5 to 70 wt % of crosslinking agent comprising at least two acrylic groups;
- c) a tertiary amine; and
- d) 0 to 45 wt % of inert solvent;

wherein the molar ratio of component c) to a) is at least 0.7, wherein
- (e) the crosslinking agent has (i) a melting point below 80° C., when measured at atmospheric pressure; and (ii) a solubility in water of less than 0.03 mol/l, when measured at 25° C.;
- (f) the composition comprises at least 5 wt % and less than 70 wt % of the said crosslinking agent;
- (g) the composition further comprises 0.05 to 10 wt % of photoinitiator;
- (h) the weight ratio of component b) to component a) is greater than 0.3; and
- (i) the anionic group is a sulpho group.

26. An electrodialysis or reverse electrodialysis unit, a flow through capacitor device, an electrodeionization module, a continuous electrodeionization module, a fuel cell, a diffusion dialysis apparatus, a membrane distillation module or a membrane electrode assembly comprising one or more membranes including a cured composition comprising, prior to curing, a) 5 to 65 wt % of curable compound comprising one ethylenically unsaturated group and at least one anionic group;
b) 2.5 to 70 wt % of crosslinking agent comprising at least two acrylic groups;
c) a tertiary amine; and
d) 0 to 45 wt % of inert solvent;

wherein the molar ratio of component c) to a) is at least 0.7, wherein
(e) the composition comprises a crosslinking agent having a melting point below 80° C., when measured at atmospheric pressure;
(f) the anionic group is a sulpho group;
(g) the composition comprises at least 5 wt % and less than 70 wt % of the said crosslinking agent;
(h) the said crosslinking agent has a solubility in water of less than 0.03 mol/l, when measured at 25° C. and has a MW of less than 1000 Dalton;
(i) the weight ratio of component b) to component a) is greater than 0.3;
(j) the composition comprises 0.05 to 10 wt % of photoinitiator;
(k) the said tertiary amine is selected from tri($C_{1-12}$-alkyl) amines and heterocyclic N—($C_{1-12}$-alkyl) amines and has a melting point below 50° C. and a MW of less than 400 Dalton; and
(l) the said curable compound has a MW of less than 1000 Dalton.

27. An electrodialysis or reverse electrodialysis unit, a flow through capacitor device, an electrodeionization module, a continuous electrodeionization module, a fuel cell, a diffusion dialysis apparatus, a membrane distillation module or a membrane electrode assembly comprising one or more membranes including a cured composition comprising, prior to curing,
a) 5 to 65 wt % of curable compound comprising one ethylenically unsaturated group and at least one anionic group;
b) 2.5 to 70 wt % of crosslinking agent comprising at least two acrylic groups;
c) a tertiary amine; and
d) 0 to 45 wt % of inert solvent;

wherein the molar ratio of component c) to a) is at least 0.7, wherein
(e) the crosslinking agent has (i) a melting point below 80° C., when measured at atmospheric pressure; and (ii) a solubility in water of less than 0.03 mol/l, when measured at 25° C.;
(f) the composition comprises at least 5 wt % and less than 70 wt % of the said crosslinking agent;
(g) the composition further comprises 0.05 to 10 wt % of photoinitiator;
(h) the weight ratio of component b) to component a) is greater than 0.3; and
(i) the anionic group is a sulpho group.

* * * * *